Sept. 15, 1925.
C. VAN D. BENNETT
MACHINE FOR PRODUCING THREADS OR GROOVES IN PLASTIC ARTICLES
Filed July 1, 1922     3 Sheets-Sheet 1
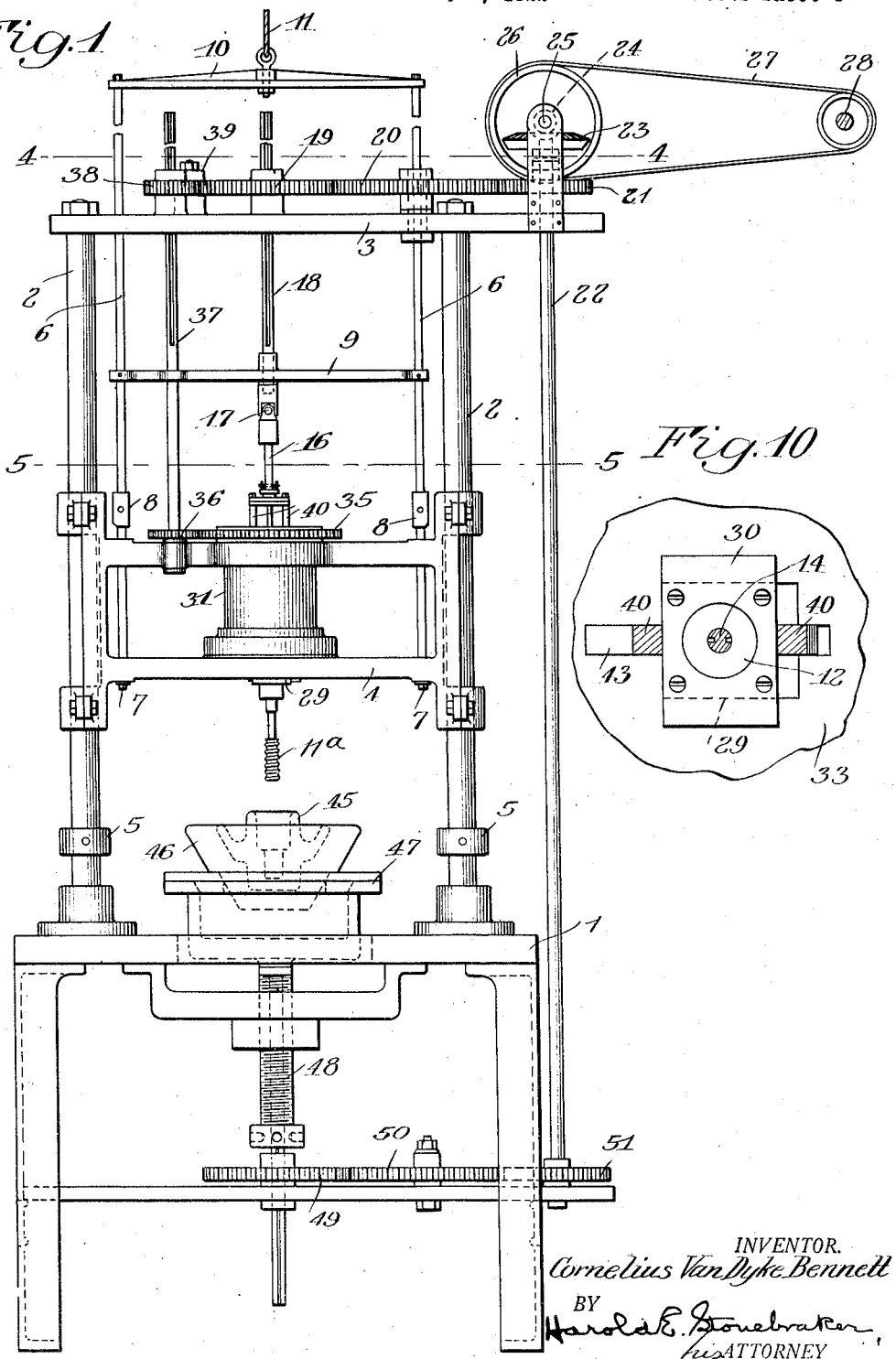
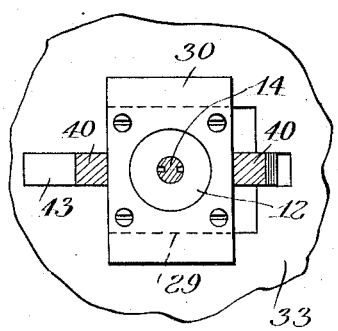
INVENTOR.
Cornelius Van Dyke Bennett
BY Harold E. Stonebraker,
his ATTORNEY

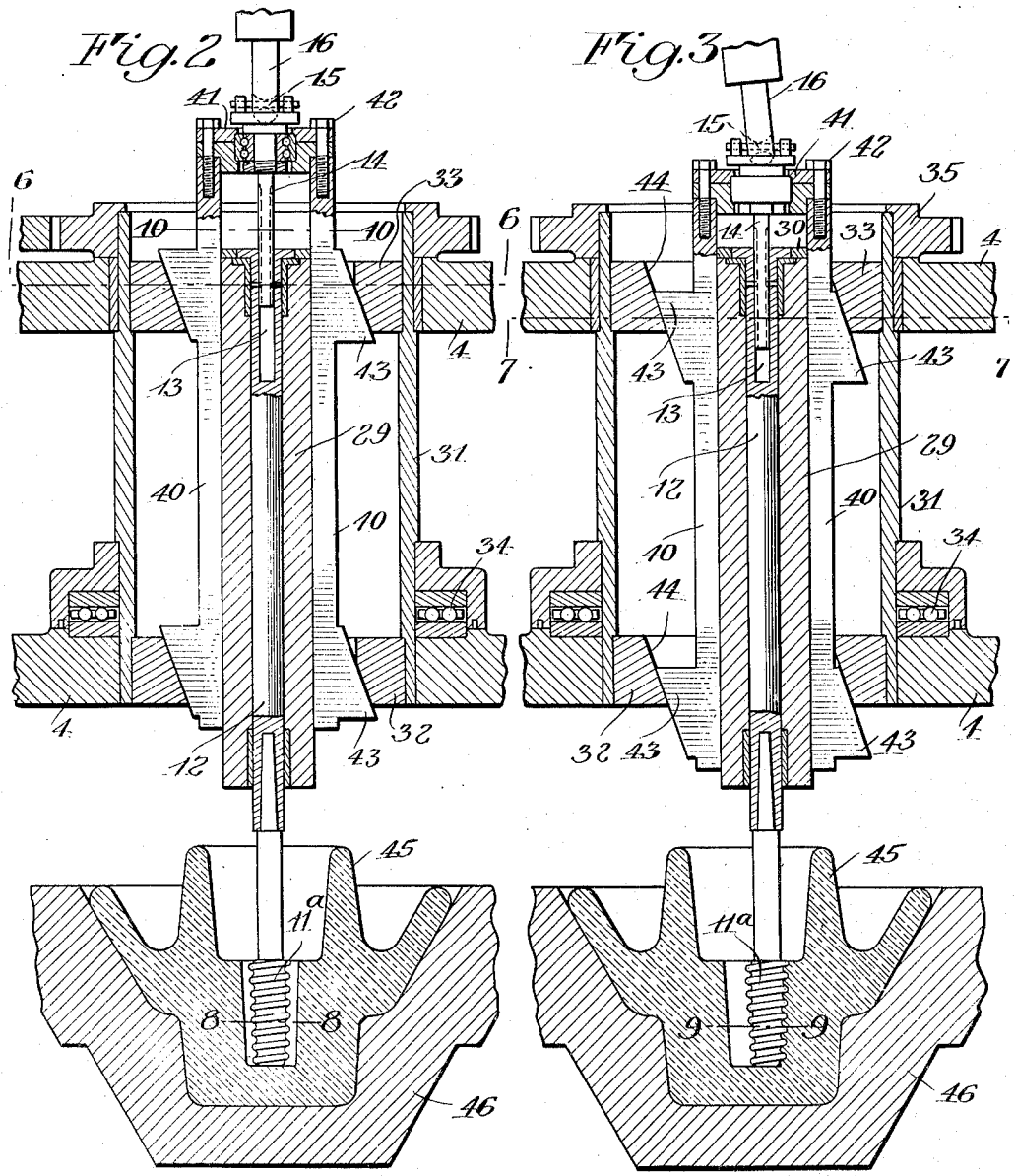

Sept. 15, 1925.  
C. VAN D. BENNETT  
1,553,356  
MACHINE FOR PRODUCING THREADS OR GROOVES IN PLASTIC ARTICLES  
Filed July 1, 1922   3 Sheets-Sheet 3
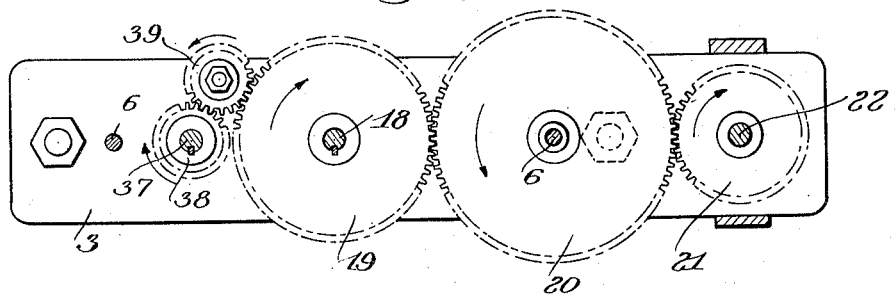
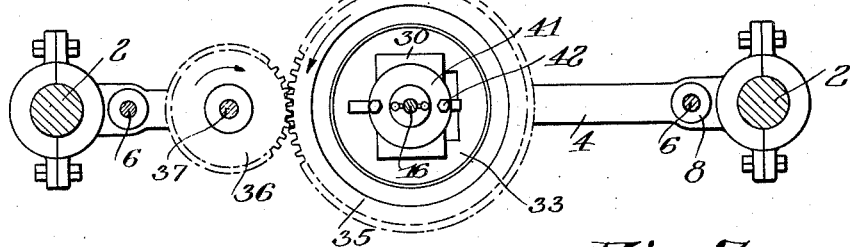
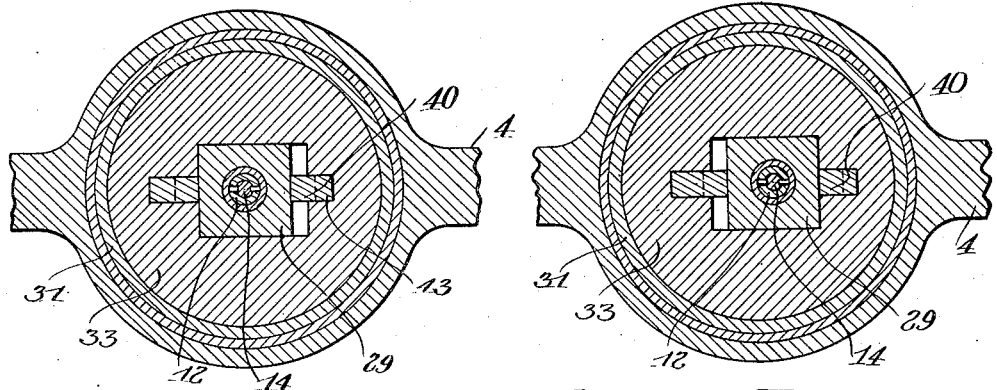
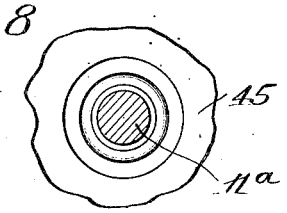
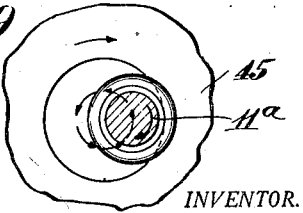
INVENTOR.
Cornelius Van Dyke Bennett
BY Harold E. Stonebraker
his ATTORNEY Patented Sept. 15, 1925.

1,553,356

UNITED STATES PATENT OFFICE.

CORNELIUS VAN DYKE BENNETT, OF LIMA, NEW YORK, ASSIGNOR TO THE PORCELAIN INSULATOR CORPORATION, OF LIMA, NEW YORK, A CORPORATION OF NEW YORK.

MACHINE FOR PRODUCING THREADS OR GROOVES IN PLASTIC ARTICLES.

Application filed July 1, 1922. Serial No. 572,237.

*To all whom it may concern:*

Be it known that I, CORNELIUS VAN DYKE BENNETT, a citizen of the United States of America, residing at Lima, in the county of Livingston and State of New York, have invented certain new and useful Improvements in Machines for Producing Threads or Grooves in Plastic Articles, of which the following is a specification.

My invention relates to a machine for producing threads or grooves in plastic articles, and more particularly to the threading of insulators while in a plastic state.

The object of the invention is to provide a practical and durable mechanism which can be readily controlled and which will effect threading of an insulator in a minimum period of time.

A further and more particular object is to arrange the parts in such a manner as to produce a perfect thread without chipping or cracking the plastic body, and to produce the necessary operations in a speedy and economical way, thereby reducing the cost of threaded insulators to a minimum.

The invention also comprehends certain other detailed improvements, all of which will appear clearly from the following description, when read in conjunction with the accompanying drawings, the novel features being pointed out in the claims following the description.

In the drawings:

Figure 1 is a general view in side elevation illustrating a preferred embodiment of the invention;

Figure 2 is a vertical sectional view showing the parts controlling the revolving and lateral motions of the threading member, and illustrating the threading member in its lowermost central position within the insulator, just prior to its lateral movement;

Figure 3 is a similar view showing the parts when the threading member has been moved laterally;

Figure 4 is a sectional view on line 4—4 of Figure 1, showing a part of the operating gearing in plan;

Figure 5 is a sectional view on line 5—5 of Figure 1;

Figure 6 is a horizontal sectional view on line 6—6 of Figure 2;

Figure 7 is a similar view on line 7—7 of Figure 3;

Figure 8 is a sectional view on line 8—8 of Figure 2;

Figure 9 is a sectional view on line 9—9 of Figure 3, the arrows showing the direction of movement of the several parts, and Figure 10 is a sectional view on line 10—10 of Figure 2.

In general, the invention comprises a carrier frame that is movable vertically on suitable guides to bring a threading member downwardly into operative engagement with an insulator, and a rotary carrier on the frame for revolving the threading member. The threading member is normally located centrally of the rotary carrier, and passing through the latter is a positioning device which has an additional vertical movement with reference to the carrier. As the positioning device moves upwardly or downwardly in the carrier, it is given a lateral motion with reference to the carrier and carries the threading member laterally with it, thus actuating the threading member from a position coinciding with the rotary axis of the carrier to a position spaced from said rotary axis, so that as the carrier rotates, the threading member will be caused to revolve or move bodily around the rotary axis of the carrier. Means are provided for rotating the threading member and the insulator, preferably at the same number of revolutions per minute and in the same direction, and revolving the threading member in an opposite direction to its axial rotation while engaged with the wall of the plastic material to be threaded.

In the disclosed arrangement, which is intended merely as an example of a preferred embodiment, 1 designates a base or table on which are mounted the vertical standards 2 connected at the top by a crosshead 3. Arranged for movement on the vertical standards 2 is a carrier frame, designated generally at 4, said frame being carried downwardly, when released, by its own weight and limited in its downward travel by the stops 5. Mounted on the carrier frame 4 is a support, said support consisting of vertical rods 6 extending through the carrier frame 4 and provided with nuts or heads 7 at the bottom thereof, whereby the carrier frame is elevated by lifting the rods 6, while 8 designate stops on the rods 6 for limiting the downward movement thereof relatively to the carrier frame 4. 9 designates a horizontal plate connecting said rods 6, while 10 is a cross-head at the upper ends thereof, and connected by a cable 11 to any suitable elevating means for lifting or lowering the threading member with reference to the insulator.

The threading tool is designated at 11ª, see Figures 1 to 3 inclusive, being fixedly attached to a shaft 12. The shaft 12 is formed hollow at its upper end, as indicated at 13, and is connected to an arbor 14 so as to permit a relative sliding and to prevent any relative rotation between said parts for a purpose that will appear presently. The arbor 14 is connected by a universal joint 15 with a stub shaft 16, which in turn has a universal connection 17 with a spindle 18. The spindle 18 is journalled and supported on the plate 9, being movable upwardly and downwardly therewith, and passes through the cross-head 3.

Splined on the spindle 18 is a gear 19 which is journalled on the cross-head 3, while 20 is an intermediate gear engaging said gear 19 and actuated by a gear 21 fixed on the vertical shaft 22. The latter also has fixed thereon a bevel gear 23 which is engaged by a bevel pinion 24 carried by the driving shaft 25. 26 is a pulley fixed on said driving shaft 25 and operated by a belt 27 from the power shaft 28. The parts just referred to constitute the means for imparting the necessary rotation of the threading member about its own axis, and I will now describe the means for effecting the lateral travel or feed of the threading member, and also its revolving motion or bodily travel in a circular path.

To effect this, the shaft 12 is supported on and rotates in a box 29 which latter has attached thereto a plate 30, see Figure 10, resting on a rotary carrier. The rotary carrier comprises a drum or cylinder 31, bottom 32 and top 33, on which latter rests the plate 30 for supporting the box 29. The rotary carrier is supported on the carrier frame 4, being mounted on ball bearings 34, and has fixed at its upper end a gear 35 that is engaged and driven by a pinion 36 fixedly mounted on a vertical shaft 37. The latter is journalled in the carrier frame 4 and extends through the plate 9 and cross-head 3, having splined thereon at its upper end a gear 38 which is journalled on the cross-head 3. The gear 38 is engaged by an intermediate pinion 39 which engages the aforementioned gear 19, see Figures 1 and 4.

The driving gears are so related as to cause the rotary carrier just described to turn in one direction while the threading member 11 rotates about its own axis in the opposite direction, the result being to cause the threading member to revolve or move bodily in a circular path which is opposed to its direction of axial rotation, as indicated in Figure 9. In order to effect the revolving or bodily circular travel of the threading member, it is necessary to effect a lateral movement of the same with reference to the rotary carrier so as to space the threading tool axis laterally from the axis of the rotary carrier, and this is accomplished by the following means.

A positioning frame is arranged within the rotary carrier already described, said positioning frame comprising oppositely disposed vertical portions 40, engaging the box 29 on opposite sides thereof, as indicated in Figures 2, 3, 6 and 7. The vertical portions 40 are connected at their upper ends to a head 41, which is mounted through ball bearings 42 on the arbor 14 so that the positioning frame is permitted to rotate with the rotary carrier already described, and also has a vertical movement with the arbor 14 and shaft 18, and with reference to the rotary carrier.

The top and bottom 33 and 32 respectively of the carrier are slotted to receive the vertical portions 40 of the positioning frame and the inclined abutments 43 thereon, and the carrier walls are provided with correspondingly inclined guides 44, whereby the positioning frame is caused to move laterally with reference to the carrier as it travels upwardly or downwardly, such change of position being indicated in Figures 2 and 3. As the positioning frame moves downwardly with reference to the rotary carrier, the arbor 14 telescopes within the shaft 12, so that the threading member, mounted on the shaft 12, rotates continuously about its own axis. In the position of the parts shown in Figure 2, the axis of rotation of the threading member corresponds with the rotary axis of the carrier, and the threading member, therefore, has only one movement, namely that of rotation, whereas in Figure 3, the axis of the threading member has been moved laterally of the rotary axis of the carrier, owing to the downward travel of the positioning frame, and in this position of the parts, the threading member will rotate about its own axis and will also revolve about the rotary axis of the carrier, thereby causing the threading member to move bodily around the opening in the insulator and against the wall to be formed.

The insulator 45 or other plastic material is arranged within a holder or mold 46 which is preferably rotated, and to this end is mounted on a table 47 to which is attached a rotary spindle 48 having fixed thereon a pinion 49. 50 is an intermediate pinion engaging the pinion 49 and in turn engaging the pinion 51 fixedly carried on the aforementioned vertical shaft 22, the gearing arrangement being such as to turn the insulator or plastic material in the same direction as that in which the threading member rotates about its own axis, as indicated in Figure 9. The threading member and insulator preferably are rotated about their respective axes at the same rotational speeds, or in other words, make the same number of rotations per minute, while the threading member revolves or travels bodily in the opposite direction.

The operation of the mechanism briefly is as follows: Assuming the parts to be in the position illustrated in Figure 1, an insulator is positioned in its holder, after which power can be applied to place the several parts in motion. The cable 11 and cross-head 10 are then permitted to move downwardly by suitable releasing mechanism, and the weight of the carrier frame moves said parts together with the threading member downwardly until they assume the position illustrated in Figure 2, in which the threading member is at the bottom of the opening in the insulator, the lowermost part of the carrier frame being then in contact with the stops 5. The carrier frame can then move no further in a downward direction, although the support, consisting of cross-head 10 and vertical rods 6, as well as the spindle 18 and parts carried thereby, can move slightly further in a downward direction until the stops 8 contact with the carrier frame, see Figure 1. This further downward travel of the spindle 18, stub shaft 16 and arbor 14 with reference to the carrier frame causes the downward movement of the positioning frame shown in Figure 3, thereby moving the threading member laterally against the wall to be formed on the insulator. When the threading operation is completed, the reverse operation takes place upon lifting the cable 11 and cross-head 10. The initial movement of said parts causes the threading member to be moved laterally until it again assumes the central position, with reference to the insulator, shown in Figure 2, after which further upward movement of the cross-head lifts the carrier frame and withdraws the threading member to the positon shown in Figure 1 to permit removal of the insulator. The stops 5 and 8 are adjustable to determine the respective movements of the several parts already described, in accordance with the requirements of the insulator or other work being performed.

While I have described the invention with reference to a particular embodiment, it is subject to modifications and changes without departing from the fundamentally novel features, and this application is intended to cover any changes or modified arrangements that come within the intended scope of the improvements or of the following claims.

I claim:

1. The combination with a holder for plastic material, of a vertically movable carrier frame arranged thereabove, a rotary carrier mounted on the frame, means for rotating the carrier, a rotary threading tool normally located centrally of the carrier, and means for bodily shifting said tool laterally thereof to position it so as to revolve about the rotary axis of the carrier.

2. The combination with a holder for plastic material, of a vertically movable carrier frame arranged thereabove, a rotary carrier mounted on the frame, means for rotating the carrier, a rotary threading tool normally located centrally of the carrier, and means for bodily shifting said tool laterally thereof to position it so as to revolve about the rotary axis of the carrier, said last mentioned means comprising a positioning frame cooperating with the threading tool and movable downwardly and laterally of the carrier.

3. The combination with a holder for plastic material, of a vertically movable carrier frame arranged thereabove, a rotary carrier mounted on the frame, means for rotating the carrier, a rotary threading tool normally located centrally of the carrier, and means for bodily shifting said tool laterally of the carrier to position it so as to revolve about the rotary axis of the carrier, said last mentioned means comprising a positioning frame cooperating with the threading tool and movable downwardly of the carrier, inclined guides on the carrier, and abutments on the positioning frame engaging said inclined guides to cause a lateral shifting of the positioning frame during its downward movement.

4. The combination with a holder for plastic material, of a vertically movable carrier frame arranged thereabove, a rotary carrier mounted on the frame, means for rotating the carrier, a rotary threading tool normally located centrally of the carrier, means for shifting said tool on the carrier to position it so as to revolve about the rotary axis of the carrier, means for imparting a rotary motion to the threading tool about its own axis independently of its revolving motion with the carrier, and means for rotating said holder for plastic material.

5. The combination with a holder for plastic material, of a vertically movable carrier frame arranged thereabove, a rotary carrier mounted on the frame, means for rotating the carrier, a rotary threading tool normally located centrally of the carrier frame, means for bodily shifting said tool laterally of the carrier to position it so as to revolve about the vertical axis of the carrier, means for imparting a rotary motion to the threading tool about its own axis independently of its revolving motion with the carrier, and means for rotating said holder for plastic material.

6. The combination with a holder for plastic material, of a vertically movable carrier frame arranged thereabove, a rotary carrier mounted on the frame, means for rotating the carrier, a rotary threading tool normally located centrally of the carrier, means for bodily shifting said tool laterally of the carrier to position it so as to revolve about the rotary axis of the carrier, said last mentioned means comprising a positioning frame movable downwardly and laterally of the carrier and cooperating with the threading tool.

7. The combination with a holder for plastic material, of a vertically movable carrier frame arranged thereabove, a rotary carrier mounted on the frame, means for rotating the carrier, a rotary threading tool normally located centrally of the carrier, means for bodily shifting said tool laterally of the carrier to position it so as to revolve about the rotary axis of the carrier, said last mentioned means comprising a positioning frame cooperating with the threading tool and movable downwardly of the carrier, inclined guides on the carrier, abutments on the positioning frame engaging said inclined guides to cause a lateral shifting of the positioning frame during its downward movement, means for imparting a rotary motion to the threading tool about its own axis independently of its revolving motion with the carrier, and means for rotating said holder for plastic material.

8. The combination with a holder for plastic material, of a vertically movable carrier frame arranged thereabove, a rotary carrier mounted on the frame, a support for the carrier frame having an additional downward movement after the carrier frame reaches its lowermost position, means for rotating the carrier, a rotary threading tool normally located centrally of the carrier, and a positioning frame cooperating with the threading tool and mounted on said support, the positioning frame acting to move the threading tool laterally of the carrier during said additional downward movement of the threading tool.

9. The combination with a holder for plastic material, of a vertically movable carrier frame arranged thereabove, a rotary carrier mounted on the frame, a support for the carrier frame having an additional downward movement after the carrier frame reaches its lowermost position, means for rotating the carrier, a rotary threading tool normally located centrally of the carrier, and a positioning frame cooperating with the threading tool and mounted on said support, the positioning frame acting to move the threading tool bodily in a direction downwardly and laterally of the carrier.

In witness whereof, I have hereunto signed my name.

CORNELIUS VAN DYKE BENNETT.